United States Patent [19]

Miyoshi et al.

[11] 4,411,953

[45] Oct. 25, 1983

[54] MAGNETIC RECORDING MEDIUM

[75] Inventors: Takahito Miyoshi; Nobuo Tsuji; Toshimitu Okutu; Masaaki Fujiyama, all of Odawara, Japan

[73] Assignee: Fuji Photo Film Co., Ltd., Kanagawa, Japan

[21] Appl. No.: 340,596

[22] Filed: Jan. 19, 1982

[30] Foreign Application Priority Data

Jan. 20, 1981 [JP] Japan .................................... 56-6748

[51] Int. Cl.³ ............................................... H01F 10/00
[52] U.S. Cl. ................................... 428/336; 428/694; 428/900
[58] Field of Search ................................ 427/127–132, 427/48; 252/62.54; 428/900, 694, 336

[56] References Cited

U.S. PATENT DOCUMENTS 4,135,032  1/1979  Akashi et al. ........................ 428/900

Primary Examiner—Bernard D. Pianalto
Attorney, Agent, or Firm—Sughrue, Mion, Zinn, Macpeak and Seas

[57] ABSTRACT

A magnetic recording medium having a magnetic layer on one surface of a nonmagnetic base and a back coating on the opposite surface is disclosed. An undercoat is formed between the nonmagnetic base and the back coating and the back coating is not thicker than $2\mu$.

8 Claims, No Drawings

MAGNETIC RECORDING MEDIUM

FIELD OF THE INVENTION

This invention relates to a magnetic recording medium, and more particularly, to a magnetic tape having high S/N ratio, low friction coefficient, good transport properties, long durability and which is free from edge bends and causes very few dropouts.

BACKGROUND OF THE INVENTION

Audio, video and computer magnetic recording tapes have magnetic recording layers that are given a smooth surface to provide higher sensitivity, particularly high output in high-frequency ranges. However, these smooth-surfaced magnetic recording tapes cannot be wound or rewound smoothly, and a variation in tape tension reduces the transport properties of the tape and causes fluctuations in tape output. Furthermore, these tapes are easily deformed or damaged. To eliminate these effects, a magnetic recording tape has been proposed that has a back coating on the surface of the nonmagnetic base opposite to that having a magnetic recording layer. However, a back coating thicker than $2\mu$ cannot provide a higher S/N ratio. To produce a magnetic tape having improved S/N ratio and transport properties, a high-modulus back coating not thicker than $2\mu$ must be used. But a high-modulus back coating does not adhere to the base intimately and easily sheds or comes off as dust to cause dropouts.

SUMMARY OF THE INVENTION

Therefore, one object of this invention is to provide a magnetic recording medium that has a low friction coefficient, good transport properties, durability and which has a back coating that adheres to a non-magnetic base firmly enough to prevent its coming off the base as dust.

Another object of this invention is to provide a magnetic recording medium having a back coating that does not impair the S/N characteristics of the medium.

These objects of this invention can be achieved by a magnetic recording medium having a magnetic layer on one surface of a nonmagnetic base and a back coating on the other surface, wherein an undercoat is formed between the base and the back coating, and the back coating is not thicker than $2\mu$.

DETAILED DESCRIPTION OF THE INVENTION

The undercoat used in this invention contains a polymer. Any type of polymer can be used, but a soft polymer having a lower modulus of elasticity than that of the back coating and nonmagnetic base is preferred. When the nonmagnetic base is made of polyester, the undercoat is preferably made of a saturated polyester resin having intimate contact with the base. Saturated polyester resins can be prepared by polycondensing dibasic acids and divalent alcohols, or by first depolymerizing polyethylene terephthalate, and then polymerizing the resulting terephthalic acid monomer with a diol. Commercial saturation polyesters include Vylon #200, 290, 300 and 500 of Toyobo Co., Ltd. and Stafix P-LB of Fuji Photo Film Co., Ltd.

According to this invention, the undercoat has preferably a glass transition temperature ($T_g$) of 70° C. or less. Since the back coating and the nonmagnetic base have a glass transition temperature of more than 70° C., the undercoat having the lower glass transition temperature can effectively diffuse stress concentration at the back coating and the base, minimizing damages due to external forces such as peeling off, bending, folding, etc.

The back coating used in this invention contains a particulate inorganic substance to modify the surface roughness and electrical resistance of the magnetic recording medium. Specific examples of the particulate inorganic substance are carbon black powder, graphite, tungsten disulfide, molybdenum disulfide, boron nitride and other inorganic particles such as $SiO_2$, $CaCO_3$, $Al_2O_3$, $Fe_2O_3$, $TiO_2$, $MgO$, $ZnO$, and $CaO$. Of these, $SiO_2$, $CaCO_3$ and $Al_2O_3$ are preferred, and $CaCO_3$ is particularly preferred. The particulate inorganic substance and a binder are used in the back coating preferably at a weight ratio of from 2.5:1 to 0.1:1, more preferably from 1.5:1 to 0.8:1.

The binder to be used in the back coating may be of any binder that is known in the art, for example, thermoplastic resins, thermosetting (reactive resins) or mixtures thereof. Examples of the thermoplastic resin include a vinyl chloride/vinyl acetate copolymer, vinyl chloride/vinylidene chloride copolymer, vinyl chloride/acrylonitrile copolymer, acrylic ester/acrylonitrile copolymer, acrylic ester/vinylidene chloride copolyer, acrylic ester/styrene copolymer, methacrylic ester/acrylonitrile copolymer, methacrylic ester/vinylidene chloride copolymer, methacrylic ester/styrene copolymer, urethane elastomer, polyvinyl fluoride, vinylidene chloride/acrylonitrile copolymer, butadiene/acrylonitrile copolymer, polyamide resin, polyvinyl butyral, cellulosic resins (e.g. cellulose acetate butyrate, cellulose diacetate, cellose propionate, nitrocellulose), styrene/butadiene copolymer, polyester resin, chlorovinyl ether/acrylic ester copolymer, amino acid and rubber resins.

Examples of the thermosetting or reactive resins include a phenolic resin, epoxy resin, polyurethane curable resin, urea resin, melamine resin, alkyd resin, acrylic reactive resins, polyisocyanate and polyamines.

These binders can be used independently or in combination thereof. For the purpose of this invention, a combination of at least one of vinyl chloride/vinyl acetate copolymer, vinyl chloride/vinylidene chloride copolymer and cellulosic resins, at least one of urethane elastomer, polyester resins and styrene/butadiene copolymer, and at least one of epoxy resins and polyisocyanate is preferred, and a combination of cellulosic resins, urethane elastomer and polyisocyanate is particularly preferred.

According to this invention, a magnetic recording medium having the features described above is obtained. In the conventional magnetic recording media, a thin back coating cannot be used without the risk of it being damaged (or scraped) during running, but this defect is absent from the recording medium of this invention. Another advantage of using the back coating of this invention is that a high-density recording at a recording wavelength of $1.3\mu$ can be achieved without reducing the video S/N ratio. For the purposes of this invention, the thickness of the back coating is in the range of from 0.2 to $2.0\mu$, preferably from 0.4 to $1.0\mu$, more preferably from 0.5 to $0.8\mu$. The undercoat is preferably not thicker than $0.4\mu$, more preferably between 0.1 and $0.2\mu$. For other materials to be used in the manufacture of the magnetic recording medium of this invention, as well as the method of its manufacture, see U.S. Pat. No. 4,135,016.

This invention is now described in greater detail by reference to the following examples which are given here for illustrative purposes only and are by no means intended to limit its scope. In the examples, all parts are by weight.

EXAMPLE 1

A coating solution having the composition indicated below was applied to the surface of a nonmagnetic base opposite to the surface of a magnetic layer of a magnetic tape to form an undercoating having a dry thickness of 0.1 to 0.2μ.

| | |
|---|---|
| Saturated Polyester resin ("Stafix P-LB" of Fuji Photo Film Co., Ltd.) | 8 parts |
| Saturated polyester resin ("Vylon #200" of Toyobo Co., Ltd.) | 2 parts |
| Methyl ethyl ketone | 250 parts |
| Toluene | 250 parts |

The undercoat was further coated with a paint having the composition indicated below to form a back coating having a dry thickness of 0.5 to 0.8μ.

| | |
|---|---|
| Vinyl chloride/vinyl acetate copolymer ("400X - 110A" of Nippon Geon Co., Ltd.) | 30 parts |
| Polyurethane ("Nipporan 2301" of Nippon Polyurethane Industry Co., Ltd.) | 15 parts |
| Polyisocyanate ("Collonate L" of Nippon Polyurethane Industry Co., Ltd.) | 25 parts |
| $CaCO_3$ powder | 150 parts |
| Methyl ethyl ketone | 300 parts |

EXAMPLE 2

A magnetic recording tape was prepared as in Example 1 except that the composition of the coating solution for undercoat was as follows:

| | |
|---|---|
| Saturated polyester resin ("Vylon #200" of Toyobo Co., Ltd.) | 10 parts |
| Methyl ethyl ketone | 500 parts |

COMPARATIVE EXAMPLE 1

A magnetic recording tape was prepared as in Example 1 except that it had the same back coating as used in Example 1 but did not have an undercoat.

COMPARATIVE EXAMPLE 2

A magnetic recording tape was prepared as in Example 1 except that a coating solution consisting of 10 parts of polyvinyl chloride and 500 parts of methyl ethyl ketone was used to form an undercoat.

Magnetic recording tape samples A, B, C and D that were prepared in Examples 1 and 2 and Comparative Example 1 and 2, respectively, were subjected to the following tests and the results are shown in Table 1 below.

Test 1

A virgin tape was caused to run 100 passes on a VHS video deck and its durability was compared with the initial value by measuring the tension both at the entrance of the rotary cylinder ($T_1$) and at the exit ($T_2$). The tape was also checked for any fluctuation in tape output.

Test 2

A virgin tape was caused to run 100 passes and its dynamic friction coefficient ($T_2/T_1$) against a stainless steel pole (3.3 cm/sec) was checked for the side of both the magnetic layer and the back coating. The result was compared with the initial value.

Test 3

A virgin tape was caused to run 100 passes on a VHS video deck and checked for any worn back coating and damaged tape surface.

Test 4

A virgin tape was caused to run 100 passes on a VHS video deck and the number of dropouts per minute was counted.

TABLE 1

| | | Sample A | Sample B | Sample C | Sample D |
|---|---|---|---|---|---|
| Output fluctuation after 100 tape passes (dB) | | 0.4 | 0.4 | 1.2 | 1.2 |
| Deck tension of virgin tape ($T_2/T_1$) | | 100/40 | 100/40 | 100/40 | 100/40 |
| Deck tension of tape after 100 passes ($T_2/T_1$) | | 90/35 | 90/35 | 95/35 | 95/35 |
| Dynamic friction coefficient of virgin tape ($T_2/T_1$) | Magnetic layer side | 0.35 | 0.35 | 0.35 | 0.35 |
| | Back coating side | 0.22 | 0.22 | 0.22 | 0.22 |
| Dynamic friction coefficient of tape after 100 passes ($T_2/T_1$) | Magnetic layer side | 0.33 | 0.33 | 0.33 | 0.33 |
| | Back coating side | 0.20 | 0.20 | 0.20 | 0.20 |
| Tape wear* | | Very slight | Very slight | Great | Great |
| Tape damage (edge bend or nick)** | | No damage | Very slight | Much | Much |
| Number of dropouts (per min) | | Less than 3 | Less than 5 | More than 20 | More than 20 |
| Glass transition temperature ($T_g$) | | 25° C. | 52° C. | — | 80° C. |

*Tape wear:
"Very slight" - Few abrasions were observed on the surface of back coating.
"Great" - Numberless abrasions were observed on the surface of back coating.
**Tape damage:
"No damage" - No tape damage was observed in five tapes which ran 100 passes on VHS video deck.
"Very slight" - Tape damage was observed in one of five tapes which ran 100 passes on VHS video deck.
"Much" - Tape damage was observed in three of five tapes which ran 100 passes on VHS video deck.

As is clear from the table, tape samples A and B having both the back coating and undercoat of this invention achieved high transport properties and durability, especially small tape damage, and they caused very few dropouts as compared to samples C and D which caused more than 20 dropouts so that the dropouts are observed by a video monitor.

While the invention has been described in detail and with reference to specific embodiment thereof, it will be apparent to one skilled in the art that various changes and modifications can be made therein without departing from the spirit and scope thereof.

What is claimed is:

1. A magnetic recording medium, comprising:
a non-magnetic support base;
a magnetic layer provided on a first surface of said support base;
an undercoat formed on a second surface of said support base opposite said first surface, said undercoat having a thickness of $0.4\mu$ or less; and
a back coating on said undercoat, said back coating having a thickness of $0.2$-$2\mu$; and comprising a particulate inorganic substance and a binder contained in a weight ratio of 2.5:1 to 0.1:1.

2. A magnetic recording medium, as claimed in claim 1, wherein said undercoat has a glass transition temperature of 70° C. or less.

3. A magnetic recording medium, as claimed in claim 1, wherein said ratio is 1.5:1 to 0.8:1.

4. A magnetic recording medium, as claimed in claim 1, wherein said nonmagnetic base comprises a polyester and said undercoat comprises a saturated polyester resin intimately contacted with said support base.

5. A magnetic recording medium, as claimed in claim 1, wherein said back coating thickness is within the range of from 0.4 to $1.0\mu$.

6. A magnetic recording medium, as claimed in claim 5, wherein said back coating thickness is within the range of from 0.5 to $0.8\mu$.

7. A magnetic recording medium, as claimed in claim 1, wherein said undercoat comprises a soft polymer having a lower modulus of elasticity than the modulus of elasticity of said back coating and said nonmagnetic base.

8. A magnetic recording medium as claimed in claim 1, wherein said undercoat has a thickness within the range of from 0.1 to $0.2\mu$.

* * * * *